(12) United States Patent
Menard

(10) Patent No.: US 6,462,667 B1
(45) Date of Patent: Oct. 8, 2002

(54) ENERGIZE TO ACTUATE ENGINEERED SAFETY FEATURES ACTUATION SYSTEM AND TESTING METHOD THEREFOR

(75) Inventor: Dennis N. Menard, Tolland, MA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/579,121

(22) Filed: May 26, 2000

Related U.S. Application Data

(60) Provisional application No. 60/168,757, filed on Dec. 6, 1999.

(51) Int. Cl.[7] .............................................. G08B 21/00

(52) U.S. Cl. ...................................... 340/660; 340/654

(58) Field of Search ................................ 340/660, 654; 361/1, 160, 166, 210

(56) References Cited

U.S. PATENT DOCUMENTS

| | | | | |
|---|---|---|---|---|
| 4,616,216 A | * | 10/1986 | Meirow et al. | 340/644 |
| 5,003,297 A | * | 3/1991 | Hirabayashi | 340/680 |
| 5,382,948 A | * | 1/1995 | Richmond | 340/825.36 |
| 5,396,215 A | * | 3/1995 | Hinkle | 340/426 |
| 5,691,706 A | * | 11/1997 | Butler et al. | 340/646 |

* cited by examiner

Primary Examiner—Julie Lieu

(57) ABSTRACT

A component actuation circuit for an engineered safety features actuation system (ESFAS) includes a plurality of coincidence logic contacts, and a plurality of parallel-connected ESFAS component relays. Each of the coincidence logic contacts closes in response to a command signal. The plurality of parallel-connected ESFAS component relays are connected in series between at least two of the plurality of coincidence logic contacts. Closure of at least two of the coincidence logic contacts energizes the parallel-connected ESFAS component relays, thereby energizing a plurality of ESFAS components.

16 Claims, 6 Drawing Sheets

LEGEND: LCL(N)=LOCAL COINCIDENCE LOGIC, CONTACTS 1 THROUGH 4

ENERGIZE TO ACTUATE ENGINEERED SAFETY FEATURES ACTUATION SYSTEM AND TESTING METHOD THEREFOR

CROSS-REFERENCE TO RELATED APPLICATIONS

This application is related to and claims the benefit of U.S. Provisional Application Serial No. 60/168,757 filed on Dec. 6, 1999.

BACKGROUND OF THE INVENTION

1. Field of the Invention

The present invention relates to a control circuit for an Engineered Safety Features Actuation System (ESFAS). More particularly, the present invention relates to an ESFAS control circuit utilizing energize to actuate relays to selectively energize ESFAS components. The present invention further relates to a method of testing the energize to actuate ESFAS control circuit to ensure proper operability of the circuit.

2. Description of Related Art

Nuclear power plants generate significant amounts of radioactive products due to the fission process. Thus, a major objective in designing nuclear power plants is to prevent any release of these radioactive fission products. In this regard, nuclear plant designers utilize multiple barriers to the prevention of fission product release. To ensure the integrity of the multiple barriers, the so-called "defense-in-depth" approach is employed. This approach employs at least three defense mechanisms to preventing fission product release. These three mechanisms include prevention, protection, and mitigation.

The prevention mechanism relates to the complete avoidance of events that could ultimately result in fission product release. Thus, robust components and systems, and stringent operating practices are utilized to prevent such events. Of course, even though components and systems are robustly designed, and procedures are fastidiously written, component failures and operational errors inevitably occur. Thus, the protection mechanism relates to those highly unlikely events that result in plant shutdown and could lead to fission product release, despite the prevention mechanism. Any conceivable component, system, and operator failure is analyzed to ensure appropriate protective measures are in place to effectively protect against such events. The mitigation mechanism relates to those events that could result in severe core damage and significant fission product release, despite the prevention and protection mechanisms. Highly unlikely events that result in core damage are postulated, and systems are designed to mitigate the effects of such events.

One of the systems utilized to mitigate severe core damaging events is the Engineered Safety Features (ESF) system. The ESF system includes components to ensure rapid core shutdown, and continued core cooling to limit fuel damage and fission product release to the reactor vessel and containment. The ESF system further includes components to ensure continued integrity of the containment building should any fission products be released from the fuel.

Many ESF systems utilize an Engineered Safety Features Actuation System (ESFAS) to selectively actuate individual ESF components. Usually, an ESFAS is designed with component relays to actuate one or more components. In this design, the component actuation relays are configured to be normally energized, and de-energize to actuate the particular component(s).

The so-called de-energize to actuate design discussed above requires the component actuation relays to be continuously energized. This continuous energization has caused numerous ESFAS relay failures, many of which have failed in a non-conservative (e.g., non-actuate) state. Moreover, while it seems fairly intuitive that the de-energize to actuate design provides an inherent "fail-safe" design feature should power be lost to the ESFAS, the fact is, that if power lost to the ESFAS, it is likely lost to the particular components, as well.

Thus, there is a need in the art to provide an ESFAS that eliminates the failure mechanisms associated with continuous relay energization. There is also a need to provide an ESFAS that eliminates this failure mechanism without jeopardizing the defense-in-depth design of the nuclear power plant.

SUMMARY OF THE INVENTION

In one aspect of the present invention, a component actuation circuit for an engineered safety features actuation system (ESFAS) includes a plurality of coincidence logic contacts, and a plurality of parallel-connected ESFAS component relays. Each of the coincidence logic contacts closes in response to a command signal. The plurality of parallel-connected ESFAS component relays are connected in series between at least two of the plurality of coincidence logic contacts. Closure of at least two of the coincidence logic contacts energizes the parallel-connected ESFAS component relays, thereby energizing a plurality of ESFAS components.

In another aspect of the present invention, a component actuation circuit for a nuclear power plant engineered safety features actuation system (ESFAS), includes ESFAS component actuation means, and coincidence logic means. The ESFAS component actuation means selectively actuates a plurality of ESFAS components. The coincidence logic means selectively connects/disconnects a power source to/from the ESFAS component actuation means in accordance with a minimally 2-of-4 coincidence logic scheme.

In still another aspect of the present invention, a method of continuously monitoring the operability of each of a plurality of parallel-connected relays includes connecting equivalent resistance elements in series on both sides of the plurality of parallel-connected relays. The equivalent resistance elements are connected to a power source, and a voltage drop across each of the equivalent resistance elements is monitored. The equivalent resistances each exhibit an electrical resistance sufficiently high to prevent any of the plurality of parallel-connected relays from energizing.

In a further aspect of the present invention, method of testing coil continuity of a plurality of parallel-connected, normally de-energized relays includes sequentially series-connecting each of the relays to (1) a resistance element and (2) a power source having a predetermined voltage level. A voltage drop across the resistance element is monitored. The resistance element exhibits an electrical resistance sufficiently high to prevent each of said relays from fully energizing.

In yet a further aspect of the present invention, a method of testing the contacts in a circuit including a plurality of parallel-connected relays and a plurality of parallel-connected contacts connected in series with the plurality of parallel-connected relays includes shutting one of the contacts and series-connecting the shut contact to a power source via a first resistance element. A voltage drop across the shut contact is monitored. A contact resistance of the shut contact is determined.

In yet still a further aspect of the present invention, a method of individually testing the operability of each of a plurality of parallel-connected component actuation relays includes series-connecting one of the component actuation relays to a power source via a component test contact and a resistance element. Proper operation of one or more components controlled by the component actuation relay connected to the power source is verified. These steps are then repeated for each of the plurality of parallel-connected component actuation relays.

In still another aspect of the present invention, a component actuation circuit for an engineered safety features actuation system (ESFAS) includes a plurality of coincidence logic contacts and a plurality of ESFAS component relays connected in parallel with one another. The coincidence logic contacts are connected to a power source, and each of the coincidence logic contacts closes in response to a command signal. The parallel-connected ESFAS component relays are connected in series between at least two of the plurality of coincidence logic contacts. At least one diode on both sides of each of the plurality of parallel-connected ESFAS component relays are connected in series with each of the plurality of parallel-connected ESFAS component relays. At least one lockout contact is connected in series with the plurality of parallel-connected ESFAS component relays, and in parallel with at least one of the plurality of coincidence logic contacts. A lockout relay is connected in parallel with the plurality of parallel-connected ESFAS component relays, and closes the at least one lockout contact, thereby maintaining the plurality of parallel-connected ESFAS component relays energized. A plurality of manually initiated contacts is connected in series with the plurality of parallel-connected ESFAS component relays, and in parallel with at least one of the plurality of coincidence logic contacts. A plurality of resistance elements is connected (1) in series with the plurality of parallel-connected ESFAS component relays and (2) in parallel with at least one of the plurality of coincidence logic contacts. The resistance elements exhibit an electrical resistance sufficiently high to prevent the plurality of parallel-connected ESFAS component relays from energizing when the plurality of coincidence logic contacts are open. At least one test relay contact is connected in series with each of the plurality of parallel-connected ESFAS component relays, and in parallel with at least one of the plurality of coincidence logic contacts. At least one limiting resistor and a diode test contact are connected in series with the at least one test relay contact. A test resistor is connected in series with the at least one test relay contact. A monitoring circuit is connected in parallel with the test resistor. At least one load test resistor and a load test contact are connected in series with at least one of the plurality of resistance elements. At least one monitoring circuit is connected in parallel with at least one of the plurality of resistance elements. An alarm circuit is connected to the at least one monitoring circuit. The alarm circuit generates an alarm when the monitoring circuit senses an abnormal condition. Closure of at least two of the plurality of coincidence logic contacts, or at least two of the plurality of manually initiated contacts, energizes the plurality of ESFAS component relays, thereby energizing one or more EFSAS components.

The present invention provides distinct features and advantages over related ESFAS designs. Specifically, the use of energize to actuate component actuation relays provides increased reliability and extended relay lifetime.

The present invention also provides for continuous passive monitoring and periodic active monitoring of the ESFAS to assure proper continuity of the entire ESFAS when in a non-actuate mode. Thus, a full simultaneous actuation of an entire ESF function is not required.

These and other features and advantages of the present invention will become more apparent to those skilled in the art when the following detailed description is read in conjunction with the accompanying drawings.

DETAILED DESCRIPTION OF THE PREFERRED EMBODIMENT

In the following description, use of the terms above and below refer to the spatial orientation with respect to FIG. 1. It is to be understood that these spatial orientation terms are used solely to facilitate the following description and not to describe the actual spatial configuration of any of the components.

Figure 1:
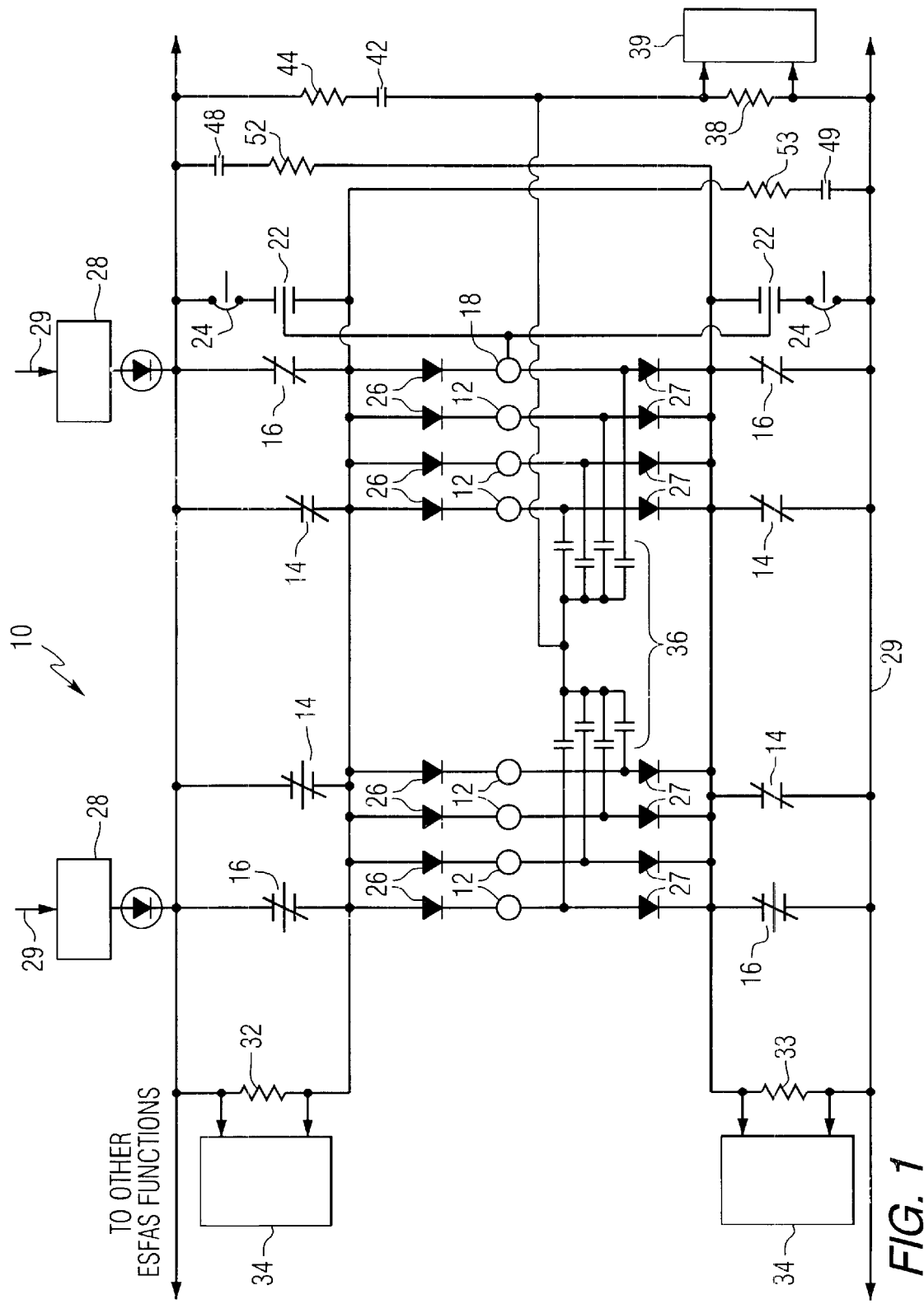
FIG. 1 is a schematic diagram of an energize to actuate circuit for a single ESFAS function according to a preferred embodiment of the present invention.

FIG. 1 depicts the basic elements of an ESFAS energize to actuate circuit 10 for a single ESFAS function, according to the preferred embodiment of the present invention. The circuit 10 includes a plurality of parallel-connected component relays 12. The number of component relays 12 is not limiting, and will vary according to the particular ESFAS function being controlled.

The parallel-connected component relays 12 are connected in series with a plurality of coincidence logic contacts 14. Preferably, the coincidence logic contacts 14 are normally closed (NC), energize-to-open type of contacts. Thus, the coincidence logic contacts 14 are open during normal operation, and are closed upon de-energization of associated coincidence logic relays (not shown). The skilled artisan will appreciate that the coincidence logic contacts 14 could be normally open, energize-to-close contacts which close upon energization of the associated logic relays. However, inherent fail-safe design criteria may dictate the preferred configuration. Additionally, in the preferred embodiment, two coincidence logic contacts 14 are connected in parallel above, and two coincidence logic contacts 14 are connected below, the parallel-connected component relays 12. Thus, the component relays 12 are energized only when at least one coincidence logic contact 14 above and below the component relays 12 are closed. The logic of the coincidence logic contacts 14 is therefore a selective 2-out-of-4 scheme. This logic scheme ensures that no single coincidence logic contact 14 failure will either cause an inadvertent ESFAS actuation, or prevent a legitimate ESFAS actuation from occurring. It will occur to the skilled artisan that this coincidence scheme and coincidence logic contact arrangement and number is not limiting, but could include other numbers, arrangements and schemes.

A manual initiation contact 16 is connected in parallel with each of the coincidence logic contacts 14. The manual initiation contacts 16 can be operated either remotely, locally, or both. As with the coincidence logic contacts 14, closure of a manual initiation contact 16 on both sides of the component actuation relays 12 is required to energize the relays 12. The manual initiation contacts 16 can be realized from any one of various components including, but not limited to, one or more rotary switches, pushbutton switches, software switches, relay contacts, or other known devices known to the skilled artisan.

A lockout relay 18 is connected in parallel with the plurality of parallel-connected component actuation relays 12. The lockout relay 18 controls the operation of one or more lockout contacts 22 connected in parallel with the coincidence logic contacts 14 and manual initiation contacts 16 above and below the parallel-connected component actuation relays 12. A lockout reset switch 24 is connected in series with each lockout contact 22. The lockout reset switch 24 is realized using separate switches, or a single multi-contact switch. Operation of the lockout relay 18, lockout contacts 22, and lockout reset switch 24 will be described more fully below.

An upper diode 26 and a lower diode 27 are connected in series with each component relay 12. The diodes 26, 27 are connected to conduct when a legitimate ESFAS actuation occurs, thus allowing the component relays to energize. The diodes 26, 27 are placed in the circuit to facilitate testing, which is described further below. Preferably, a single upper diode 26 is series-connected above each component relay 12, and a single lower diode 27 is series-connected below each component relay 12. However, the skilled artisan will appreciate that more than one upper and lower diode 26, 27 could be connected above and below the component relays 12.

Redundant power supplies 28, including a common return line 29, are used to supply power to each ESFAS circuit 10. Preferably, the power supplies 28 are auctioneered, though this is not a limiting design feature of the invention. The power supplies 28 service more than one ESFAS function circuit 10, as depicted in FIG. 1. However, each circuit 10 could be designed to include its own set of redundant power supplies 28.

The ESFAS circuit 10 also includes several components that facilitate continuous and/or automatic testing of the circuit 10 and its various components. These components include two passive monitoring resistance elements 32, 33 connected, one each, above and below the parallel-connected component relays 12. The passive monitoring resistance elements 32, 33 are also connected in parallel with the coincidence logic contacts 14, manual initiation contacts 16, and lockout contacts 22 connected on the same side of the component relays 12 as the passive monitoring resistance elements 32, 33. The upper passive monitoring resistance element 32 is connected between the power supplies 28 and the upper diodes 26, and the lower passive monitoring resistance element 33 is connected between the common return line 29 and the lower diodes 27. A monitoring circuit 34 is connected to each of the passive monitoring resistance elements 32, 33. While two passive monitoring resistance elements 32, 33 are depicted, it will be appreciated that these elements could be made up of a plurality of elements to achieve the desired resistance value. Additionally, although resistors are schematically represented, the skilled artisan will appreciate that other components could be used to exhibit the desired value of resistance.

The test components further include a plurality of component actuation test contacts 36, which are normally open during normal ESFAS operation. A single test contact 36 is associated with each of the parallel-connected component relays 12, and is electrically connected at one end between each component relay 12 and its associated lower diode 27. The test contacts 36 are electrically connected at their other ends to a common connection point between a second resistance element 38, and a series-connected lower diode test contact 42 and third resistance element 44. The series-connected lower diode test contact 42 and third resistance element are connected at its upper end to the power supplies 28, and the second resistance element 38 is connected at its lower end to the power supply return line 29. A monitoring circuit 39 is connected across the second resistance element 38.

Additionally, the test components include two sets of a series connected load test contact 48, 49 and load test resistance 52, 53. The upper load test contact 48 and resistance 52 set are series-connected between the power supplies 28 and the lower passive monitoring resistance element 33. The lower load test contact 49 and resistance 53 set are series-connected between the power supply return line 29 and the upper passive monitoring resistance element 32.

During normal operations, the coincidence logic contacts 14, manual contacts 16, and lockout contacts 22 are open. Thus, the component relays 12 are de-energized. If control and monitoring equipment (not depicted) determine that an ESF function is necessary, coincidence logic relays (not depicted) will be de-energized causing the coincidence logic relays 14 to close. As a result, a low resistance current path is established between the power supplies 28, through the coincidence logic relays 14, the upper and lower diodes 26, 27, and the component relays 12 to the power supply return line 29. The energized component relays 12 cause ESF components to begin operating.

Simultaneous with the above, current also flows through the lockout relay 18. When lockout relay 18 energizes, this causes lockout contacts 22 to close. Thus, the current path through the component relays 12 is locked in, even if the coincidence logic relays 14 subsequently open. Hence, to reset the ESFAS circuit 10 to its normal configuration, lockout reset switch 24 must be operated to interrupt the current path.

Similar operations occur if an operator determines that an ESF function is needed and manually initiates the ESFAS by closing the manual contacts 16.

Because this ESFAS operates on the energize to actuate principle, it is important that operability of circuit 10 is frequently determined. This is because particular open circuit faults in the actuation logic would be more difficult to detect than in a conventional de-energize to actuate circuit. It is further important that the coincidence logic contacts 14 and manual initiation contacts 16 be tested under full load conditions, since simple verification of contact 14, 16 closure does not verify that it can carry the current load necessary to energize the parallel-connected component relays 12.

The testing and monitoring of the ESFAS circuit 10 of the preferred embodiment of the present invention utilizes a four pronged approach. The first includes continuous passive monitoring of critical system voltage levels. The second includes automatic (or manually initiated) periodic continuity testing. The third includes automatic (or manually initiated/assisted) simulated load testing. And the fourth includes individual component actuation testing. Each of these tests will be described hereinafter in more detail. It will be understood, of course, that the test methodology outlined herein is not limiting, but is only the preferred test methodology for the preferred circuit. Other testing features and methodology will be apparent to the skilled artisan.

Continuous passive monitoring is conducted using the upper and lower passive monitoring resistance elements 32, 33 and the corresponding monitoring circuits 34, under the control of a microprocessor (not depicted). It should be noted that the upper and lower passive monitoring resistance elements 32, 33 are of equivalent resistance values, and have a sufficient resistance to ensure current flow through the component actuation relays 12 is insufficient to energize the relays. Of course, the resistance values are also small enough to detect circuit abnormalities. In the preferred embodiment, the resistance values would be approximately 10 K-ohm, but the skilled artisan will appreciate that other values can be chosen. Since the upper and lower passive monitoring resistance elements 32, 33 are of equivalent resistances, under normal circuit operation each will drop approximately half of the power supply 28 voltage.

Figure 2:
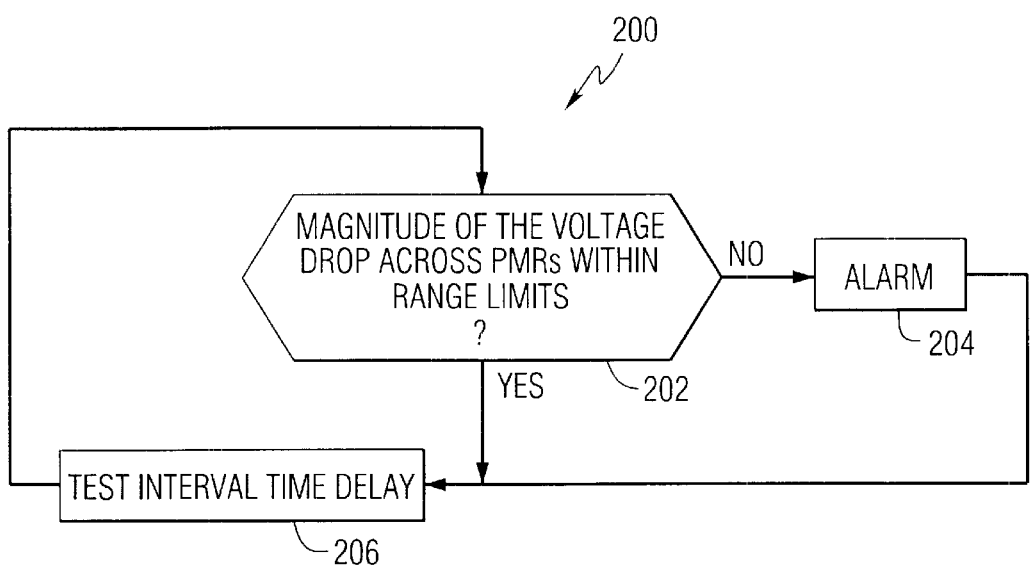
FIG. 2 is a flowchart depicting a general testing sequence for continuous passive monitoring of the energize to actuate circuit according to the present invention.

FIG. 2 depicts a simple flowchart of the basic testing sequence (200) for the continuous passive monitoring test. During the test, the magnitude of the voltage drops across each of the upper and lower passive monitoring resistance elements 32, 33 is sensed via the corresponding monitoring circuits 34, and compared to a predetermined limit (202). If the magnitude of the voltage drops is outside the limit, this indicates an abnormality and an alarm is sounded (204). For example, if the resistance of one of the upper coincidence logic contacts 14 or manual initiation contacts 16 decreases to about 100 K-ohm, the voltage drop across the upper passive monitoring resistance element 32 will decrease approximately 10%. There will also be a concomitant increase in the voltage drop across the lower passive monitoring resistance element 33 under this circumstance. Additionally, an abnormal condition that could pose a testing hazard will inhibit further automatic testing. Then, a predetermined time delay is initiated (206) before the process repeats (202). Thus, with this test sequence (200), continuous passive monitoring of the continuity of the ESFAS circuit is conducted.

Figure 3:
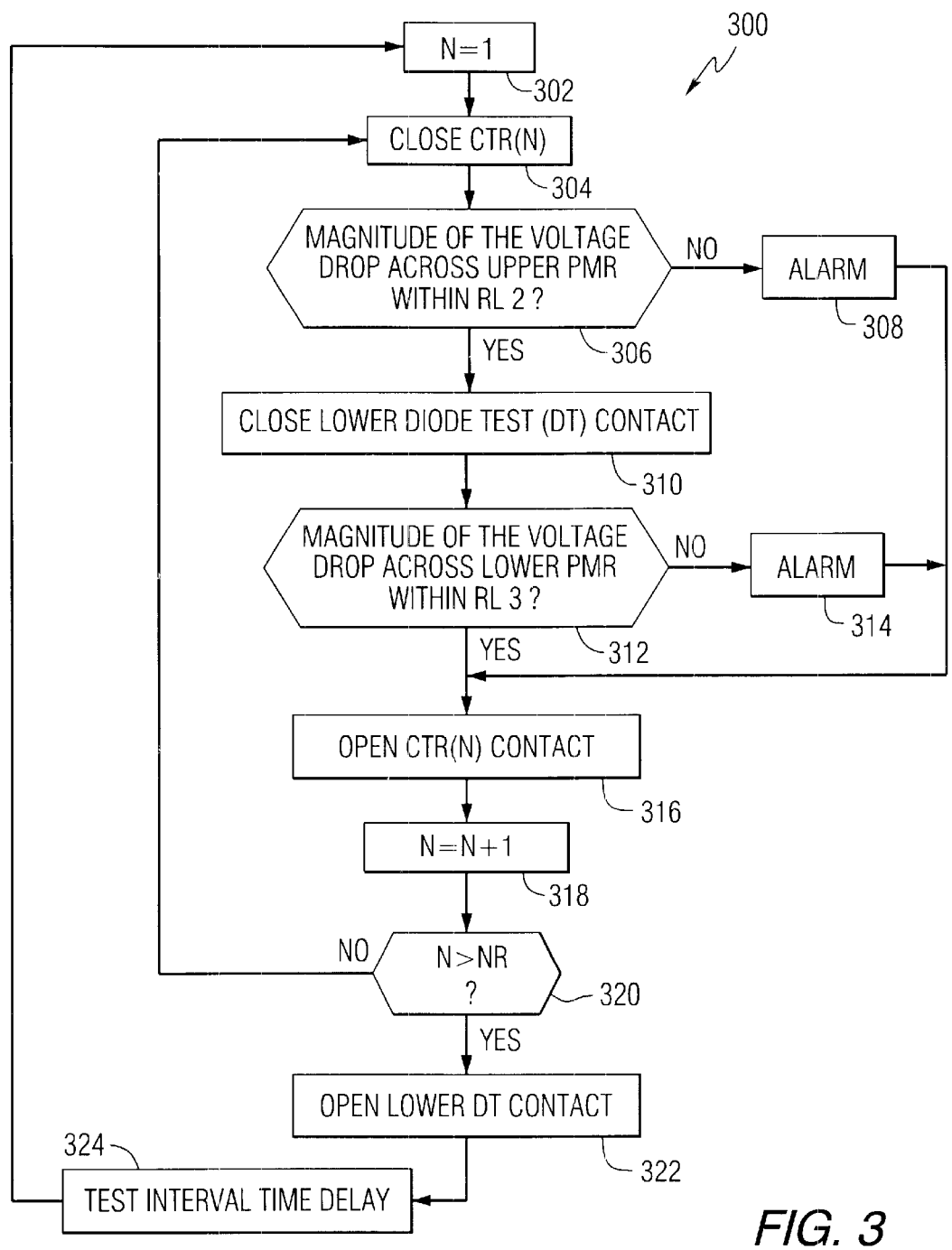
FIG. 3 is a flowchart depicting a general testing sequence for an automatic coil continuity test according to the present invention.

The automatic (or manually initiated) periodic continuity test is accomplished by sequentially closing each of the component actuation test contacts 36. This sequential contact closure can be done automatically under microprocessor control, or manually by an operator, while the ESFAS circuit 10 is in a non-actuate condition. Preferably, however, it is performed by a microprocessor. The test sequence (300), depicted summarily in FIG. 3, begins by setting a variable (N) equal to one (302). Then, one of the component actuation test contacts 36 is closed (304). Closing a component actuation test contact 36 connects the second resistance element 38 in parallel with the lower passive monitoring resistance element 33. Since the second resistance element 38 has a resistance value significantly less than the lower passive monitoring resistance element 33, it effectively shunts the lower passive monitoring resistance element 33. For example, in the preferred embodiment, the second resistance element 38 has a resistance value of 20 ohms.

Next, the magnitude of the voltage drop across the upper resistance 32 is monitored (306). Since the second resistance element 38 is small compared to the upper and lower passive monitoring resistance elements 32, 33, nearly all of the power supply 28 voltage should drop across the upper passive monitoring resistance element 32. Thus, a determination is made whether the voltage drop is approximately the full power supply 28 voltage. If it is not, the condition may indicate an open upper diode 26 or component relay coil 12, and it is alarmed (308). It should be noted that the value of the upper passive monitoring resistance element 32, even with the second resistance element 38 in the circuit, is sufficiently high to prevent the component relays 12 from fully energizing.

If approximately full supply voltage is sensed across the upper resistance element 32, the lower diode test contact 42 is closed (310). This places the third resistance element 44 into the circuit to form a voltage divider with the second resistance element 38, which allows testing of the lower blocking diodes 27. The third resistance element 44 has a resistance value significantly smaller than the upper and lower passive monitoring resistance elements 32, 33. More specifically, in the preferred embodiment the third resistance element 44 is selected to have a resistance value slightly less than a component relay 12. Next, the voltage drop across lower passive monitoring resistance element 33 is monitored (312) and if it is not within a specified range limit an alarm is generated (314). Specifically, the monitoring circuit 34 connected across lower passive monitoring resistance element 33 should sense a voltage drop of approximately one diode drop less than the voltage drop sensed by the monitoring circuit 39 connected across the second resistance element 38. If the lower blocking diode 27 under test is open, the monitoring circuit 34 will not detect any voltage change. If the upper blocking diode 26 is shorted, and the lower blocking diode 27 is open, then the monitoring circuit 34 will detect an intermediate voltage value.

Next, then the individual component actuation test contact 36 is opened (316), and the variable "N" is incremented by one (318). The variable "N" is then compared to a predetermined value "NR" to determine whether all of the component actuation test contacts 36 have been closed (320). If so, then the diode test contact 42 is opened (322), and a test interval time delay (324) is initiated before repeating the test (302). If not all of the component actuation contacts 36 have been sequentially closed, the test sequence (300) returns to implement the test for the next component actuation contact 36 (304).

Figure 4:
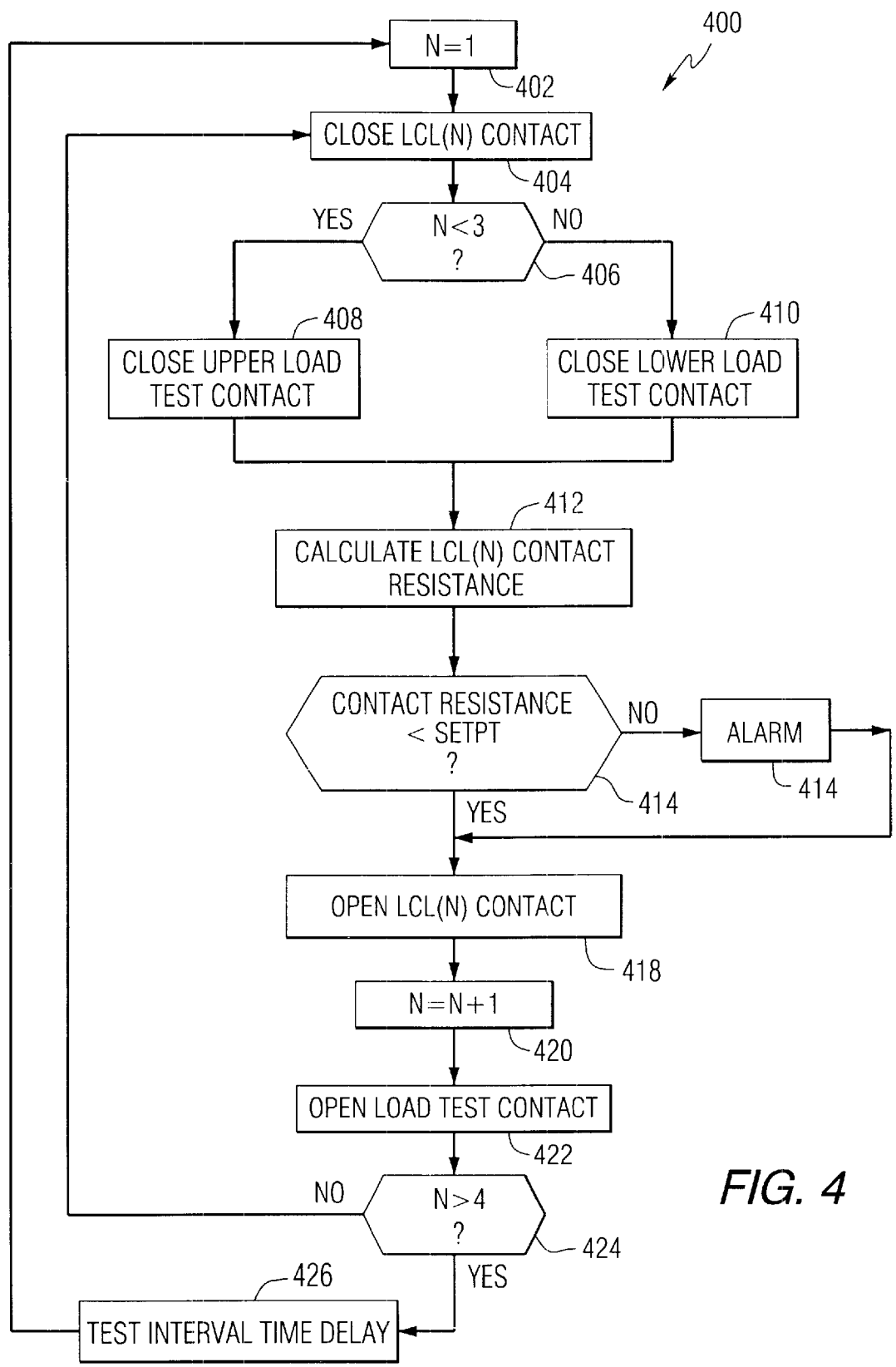
FIG. 4 is a flowchart depicting a general testing sequence for testing coincidence logic contacts under simulated load according to the present invention.

The previous testing sequences (200), (300) verify proper voltage and continuity during ESFAS standby operation. The simulated load testing and individual component actuation testing verify the ability of the ESFAS circuit 10 to perform its required function under simulated load conditions. The simulated load testing sequentially closes each coincidence logic contact 14, applies a simulated load to the contact 14, and calculates its contact resistance. Specifically, and with reference to FIG. 4, the simulated load testing sequence 400 is depicted. Initially, a variable "N" is set to equal one (402). Then, one of the coincidence logic contacts 14 is closed (404). Although not depicted in the test sequence, it will be appreciated that closure of a coincidence logic contact 14 will short either the upper or lower passive monitoring resistance element 32, 33, depending on which contact is being tested. Thus, the particular monitoring circuit 34 will sense zero voltage drop across the closed coincidence logic contact 14 under no-load conditions. Thereafter, a determination is made as to whether the variable "N" is less than three (406). If "N" is less than three then the upper load test contact 48 is closed (408), if "N" is not less than three then the lower load test contact 49 is closed (410). It will be appreciated that the number that "N" is compared to can vary depending on the number of coincidence logic contacts incorporated into the design.

Closure of the upper or lower load test contact 48, 49 places one of the load test resistors 52, 53 into the circuit 10.

The load test resistors 52, 53 are low value, high wattage resistance elements that are sized to simulate full load conditions across individual coincidence test contacts 14. Thus, if the lower load test contact 49 is closed, full load current will flow through the closed coincidence logic contact 14, and through the lower load test contact 49 and resistor 53. The monitoring circuit 34 of the upper resistance element 32 detects any change in voltage drop across the coincidence logic contact 14, and the the resistance of the closed coincidence logic contact 14 is calculated therefrom (412).

The calculated coincidence logic contact 14 resistance is then compared to a predetermined setpoint (414). If the resistance exceeds a setpoint, the condition is alarmed (414). If the resistance is less than the setpoint, or after the condition is alarmed, the coincidence logic contact 14 under test is opened (418), variable "N" is incremented by one (420), and the load test contact 48 or 49 is opened (422). The variable "N" is then checked to determine whether it exceeds the number of coincidence logic contacts 14, which in the preferred embodiment is four (424). If not, the test repeats for the next coincidence logic contact 14, and if so, the entire sequence (400) is repeated after a test interval time delay (426).

It should be noted that the above-described simulated load testing can also be performed for each manual initiation contact 16. To do so requires operator action to close the manual initiation contacts 16. It should be further noted that during the simulated load testing, the ESFAS is fully operational, and capable of responding to a legitimate ESFAS actuation command. Moreover, no failure of a component will either cause or prevent a legitimate ESFAS actuation during the test.

Figure 5A:
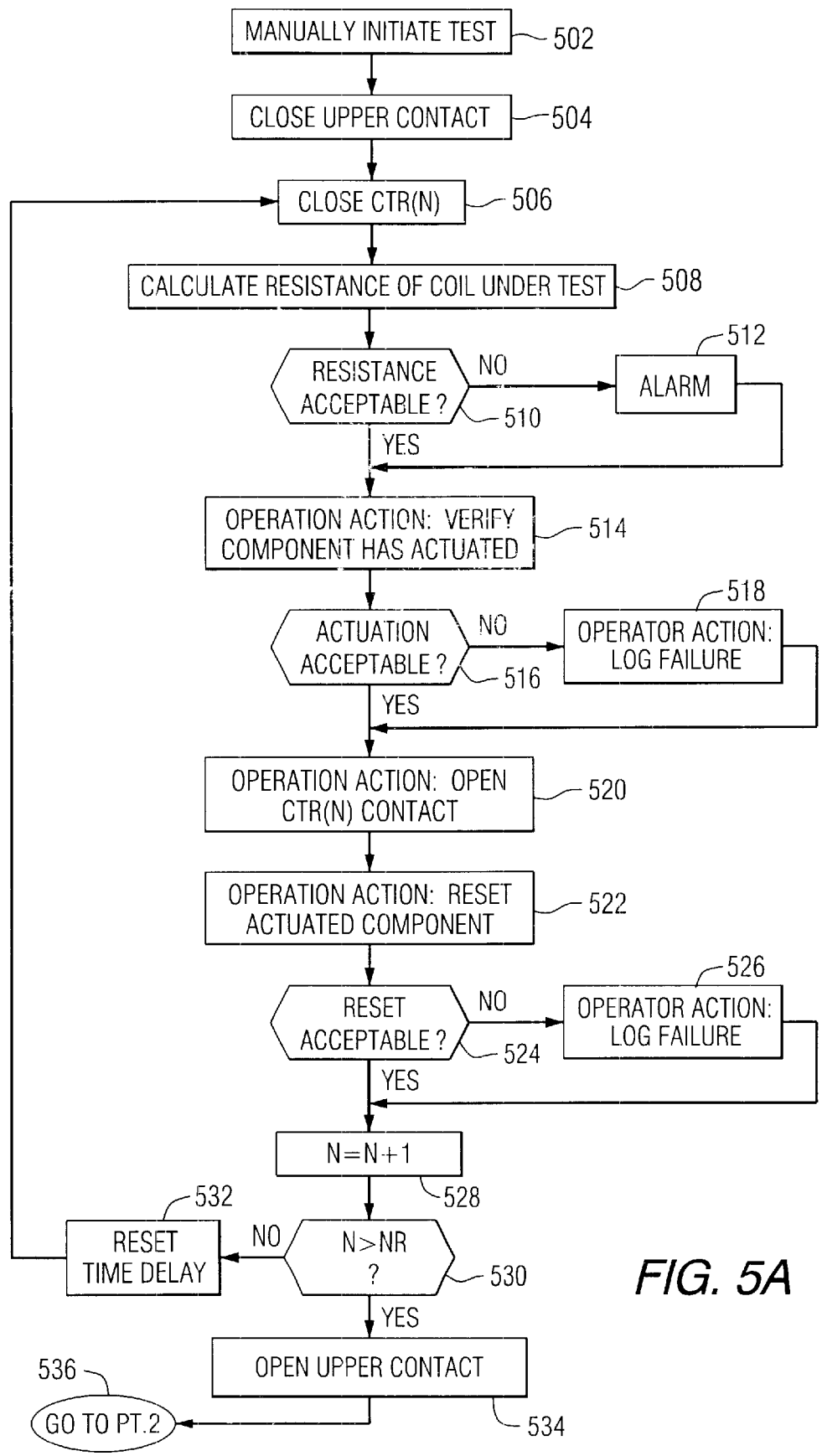
FIGS. 5A and 5B are flowcharts depicting a general testing sequence for individually testing component actuation relays according to the present invention.
Figure 5B:
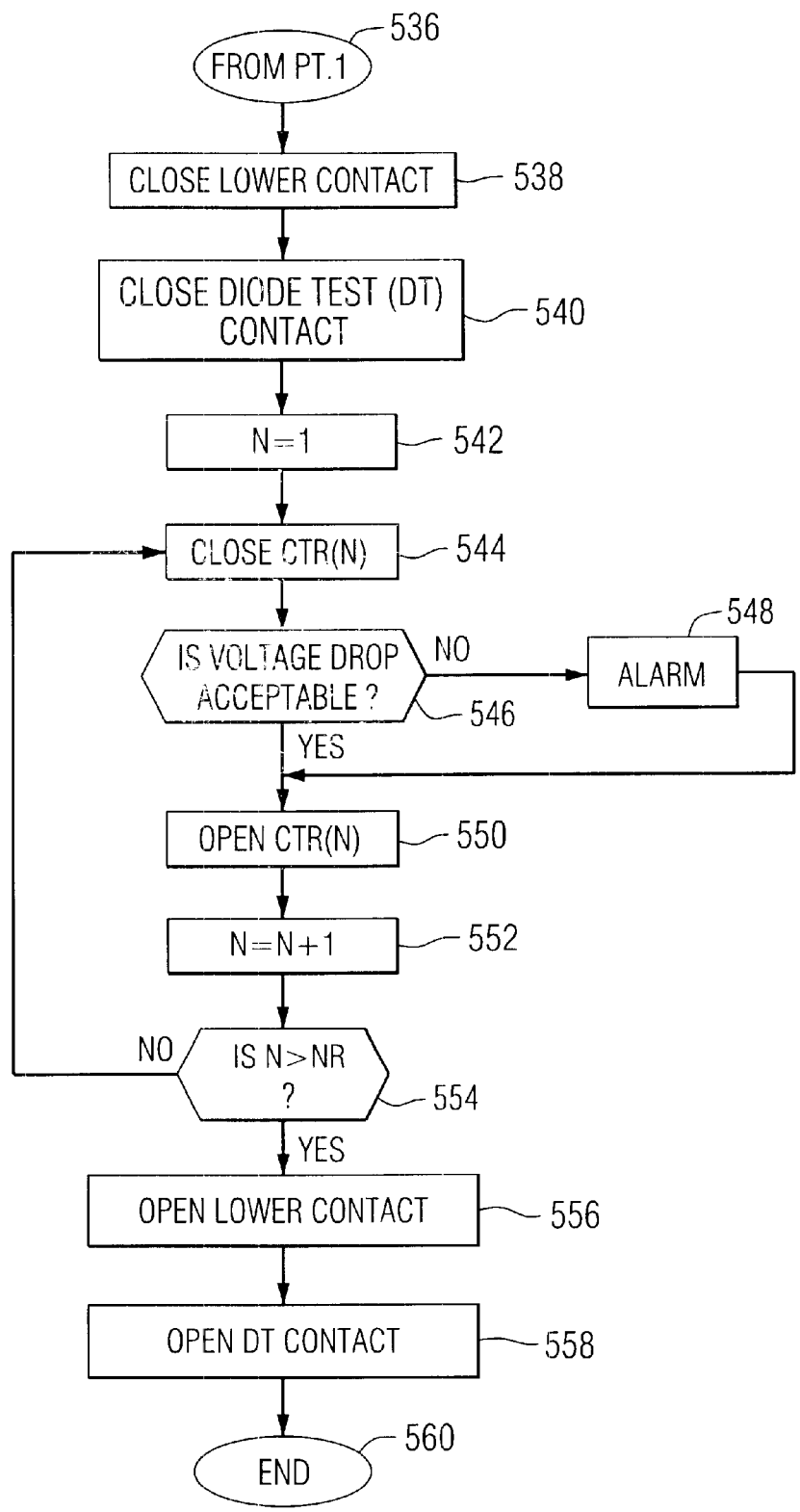

The final test, the sequence (500) of which is depicted in FIGS. 5A and 5B, individually tests the component relays 12 to verify operability of the component relay 12 contacts in the equipment controlled by the component relay 12. Unlike the preceding tests, this test requires manual intervention by operators n order to verify the component is actuated and to manually shut off the actuated component when the individual test is complete. A time delay is implemented between sequential component relay 12 tests to allow components to reposition to the non-actuate state.

The particular components used in this test depend upon which coincidence logic contacts 14 are being operated. Initially, the test is manually initiated (502) by closing one of the upper coincidence logic contacts 14 (504). One of the component actuation test contacts 36 is then closed (506), sending current through one of the component relays 12. Then, similar to the previously described test, the coil resistance of the component relay is calculated (508).

A determination is then made as to whether the calculated coil resistance is acceptable (510), and if not an alarm is annunciated (512). Then, an operator verifies that the controlled component has actually actuated (514) and that the actuation is acceptable (516). If the actuation is not acceptable, the operator takes appropriate action and logs the failure (518). In any event, the operator then takes action to open the closed component actuation test contact 36 (520), reset the actuated component (522), and verify that the component has acceptably reset (524). If the component has not reset properly, the operator takes appropriate action and logs the failure (526).

The variable "N" is then incremented by one (528), and compared to the value "NR" to determine whether all of the component actuation test contacts 36 have been sequentially closed (530). If not, the reset time delay is initiated (532) and the sequence is conducted for the next component actuation test contact 36 (506). If all of the component actuation test contacts 36 have been closed in sequence, then the upper coincidence logic contacts are opened (534) and the next portion of the test is conducted (536).

The next portion of the test, depicted in FIG. 5B, tests the lower blocking diodes 27 under simulated load conditions. First, one of the lower coincidence logic contacts 14 is closed (538). Then, the lower diode test contact 42 is closed (540). The variable "N" is again set to the value of one (542), and a component actuation test contact 36 is closed (544). Thus, a simulated fill load current is supplied through third resistance element 44, and the closed component actuation test contact 36, a lower blocking diode 27, and the closed coincidence logic contact 14, which are in parallel with the second resistance element 38. The voltage across the second resistance element 38, monitored by the monitoring circuit 39, is checked to determine whether or not it is acceptable (546). An acceptable voltage is a single diode voltage drop, due to conduction of the lower blocking diode 27. If the voltage is not acceptable, an alarm is sounded (548).

In any event, the component actuation test contact 36 is then opened (550), variable "N" is incremented by one (552), and "NR" is compared to determine whether all of the test contacts 36 have been sequentially closed (554). If all of the test contacts 36 have not been sequentially closed, the sequence is repeated for the next test contact 36 (544). If all of the test contacts 36 have been sequentially closed, the lower coincidence logic contact 14 (556) and the lower diode test contact 42 are opened (558), and the test is completed (560).

While preferred embodiments of the present invention have been illustrated in detail, it is apparent that modifications and adaptations of the preferred embodiments will occur to those skilled in the art. However, it will be expressly understood that such modifications and adaptations are within the spirit and scope of the present invention as set forth in the following claims.

I claim:

1. A component actuation circuit for an engineered safety features actuation system (ESFAS), comprising:
    a plurality of coincidence logic contacts connected to a power source, each of said coincidence logic contacts closing in response to a command signal;
    a plurality of parallel-connected ESFAS component relays connected in parallel with one another, said plurality of parallel-connected EFAS component relays being connected in series between at least two of said plurality of coincidence logic contacts; and
    a plurality of first resistance elements connected (1) in series with said plurality of parallel-connected ESFAS component relays and (2) in parallel with at least one of said plurality of coincidence logic contacts;
    wherein closure of at least two of said plurality of coincidence logic contacts energizes said plurality of parallel-connected ESFAS component relays, thereby energizing a plurality of ESFAS components, and said resistance elements exhibit an electrical resistance sufficiently high to prevent said plurality of parallel-connected ESFAS component relays from energizing when said plurality of coincidence logic contacts are open.

2. A component actuation circuit for an ESFAS according to claim 1, further comprising:
    at least one test relay contact connected (1) in series with each of said plurality of parallel-connected ESFAS component relays and (2) in parallel with at least one of said plurality of coincidence logic contacts.

3. A component actuation circuit for an ESFAS according to claim 2, further comprising:

at least one second resistance element and a diode test contact connected in series with said at least one test relay contact.

4. A component actuation circuit for an ESFAS according to claim 2, further comprising:

a third resistance element connected in series with said at least one test relay contact.

5. A component actuation circuit for an ESFAS according to claim 4, further comprising:

a monitoring circuit connected in parallel with said third resistance element.

6. A component actuation circuit for an ESFAS according to claim 1, further comprising:

at least one fourth resistance element and a load test contact connected in series with at least one of said plurality of first resistance elements.

7. A component actuation circuit for an ESFAS according to claim 1, further comprising:

at least one monitoring circuit connected in parallel with at least one of said plurality of first resistance elements.

8. A component actuation circuit for an ESFAS according to claim 7, further comprising:

an alarm circuit connected to said at least one monitoring circuit, said alarm circuit generating an alarm when said monitoring circuit senses an abnormal condition.

9. A component actuation circuit for an engineered safety features actuation system (ESFAS), comprising:

a plurality of coincidence logic contacts connected to a power source, each of said coincidence logic contacts closing in response to a command signal;

a plurality of parallel-connected ESFAS component relays connected in parallel with one another, said plurality of parallel-connected EFAS component relays being connected in series between at least two of said plurality of coincidence logic contacts; and at least one diode on both sides of each of said parallel-connected ESFAS component relays, and being connected in series with each of said parallel-connected ESFAS component relays;

wherein closure of at least two of said plurality of coincidence logic contacts energizes said plurality of parallel-connected ESFAS component relays, thereby energizing a plurality of ESFAS components.

10. A component actuation circuit for a nuclear power plant engineered safety features actuation system (ESFAS), comprising:

ESFAS component actuation means for selectively actuating a plurality of ESFAS components upon energization thereof;

coincidence logic means for selectively connecting/disconnecting a power source to/from said ESFAS component actuation means in accordance with a minimally 2-of-4 coincidence logic scheme; and first resistance means for limiting current flow from the power source through said ESFAS component actuation means when said coincidence logic means selectively disconnects said ESFAS component actuation means from the power source.

11. A component actuation circuit for a nuclear power plant ESFAS according to claim 10, further comprising:

component actuation test means for selectively connecting said ESFAS component actuation means to the power source via said first resistance means and second resistance means.

12. A component actuation circuit for a nuclear power plant ESFAS according to claim 11, further comprising:

relay coil simulation resistance means for simulating a resistance of a relay coil; and diode test means for selectively connecting said coincidence logic means to the power source via said relay coil simulation resistance means.

13. A component actuation circuit for a nuclear power plant ESFAS according to claim 10, further comprising:

load test resistance means for simulating a full load resistance; and load test means for selectively connecting said coincidence logic means to the power source via said load test resistance means.

14. A component actuation circuit for a nuclear power plant ESFAS according to claim 10, further comprising:

monitoring means for monitoring a voltage drop across said first resistance means.

15. A component actuation circuit for a nuclear power plant ESFAS according to claim 14, further comprising:

alarm generation means for generating an alarm when the monitored voltage drop reaches a predetermined setpoint.

16. A component actuation circuit for an engineered safety features actuation system (ESFAS), comprising:

a plurality of coincidence logic contacts connected to a power source, each of said coincidence logic contacts closing in response to a command signal;

a plurality of ESFAS component relays connected in parallel with one another, said parallel-connected ESFAS component relays being connected in series between at least two of said plurality of coincidence logic contacts;

at least one diode on both sides of each of said plurality of parallel-connected ESFAS component relays, and being connected in series with each of said plurality of parallel-connected ESFAS component relays;

at least one lockout contact connected in series with said plurality of parallel-connected ESFAS component relays, and in parallel with at least one of said plurality of coincidence logic contacts;

a lockout relay connected electrically in parallel with said plurality of parallel-connected ESFAS component relays, said lockout relay closing said at least one lockout contact, thereby maintaining said plurality of parallel-connected ESFAS component relays energized;

a plurality of manually initiated contacts connected in series with said plurality of parallel-connected ESFAS component relays, and in parallel with at least one of said plurality of coincidence logic contacts;

a plurality of resistance elements connected (1) in series with said plurality of parallel-connected ESFAS component relays and (2) in parallel with at least one of said plurality of coincidence logic contacts, said resistance elements exhibiting an electrical resistance sufficiently high to prevent said plurality of parallel-connected ESFAS component relays from energizing when said plurality of coincidence logic contacts are open;

at least one test relay contact connected in series with each of said plurality of parallel-connected ESFAS component relays, and in parallel with at least one of said plurality of coincidence logic contacts;

at least one limiting resistor and a diode test contact connected in series with said at least one test relay contact;

a test resistor connected in series with said at least one test relay contact;

a monitoring circuit connected in parallel with said test resistor;

at least one load test resistor and a load test contact connected in series with at least one of said plurality of resistance elements;

at least one monitoring circuit connected in parallel with at least one of said plurality of resistance elements; and an alarm circuit connected to said at least one monitoring circuit, said alarm circuit generating an alarm when said monitoring circuit senses an abnormal condition, wherein closure of at least two of said plurality of contacts, or at least two of said plurality of manually initiated contacts, energizes said plurality of ESFAS component relays, thereby energizing one or more EFSAS components.

* * * * *